United States Patent
Kashiwai

(10) Patent No.: US 9,643,649 B2
(45) Date of Patent: May 9, 2017

(54) DRIVING SUPPORT APPARATUS AND DRIVING SUPPORT METHOD

(71) Applicant: TOYOTA JIDOSHA KABUSHIKI KAISHA, Toyota-shi, Aichi (JP)

(72) Inventor: Tadahiro Kashiwai, Susono (JP)

(73) Assignee: TOYOTA JIDOSHA KABUSHIKI KAISHA, Toyota-shi, Aichi (JP)

( * ) Notice: Subject to any disclaimer, the term of this patent is extended or adjusted under 35 U.S.C. 154(b) by 0 days.

(21) Appl. No.: 14/784,098

(22) PCT Filed: Apr. 28, 2014

(86) PCT No.: PCT/JP2014/062291
§ 371 (c)(1),
(2) Date: Oct. 13, 2015

(87) PCT Pub. No.: WO2014/178445
PCT Pub. Date: Nov. 6, 2014

(65) Prior Publication Data
US 2016/0052547 A1  Feb. 25, 2016

(30) Foreign Application Priority Data
May 1, 2013  (JP) ................................. 2013-096505

(51) Int. Cl.
*B62D 15/02* (2006.01)
*B60W 30/10* (2006.01)
(Continued)

(52) U.S. Cl.
CPC ........... *B62D 15/025* (2013.01); *B60W 30/02* (2013.01); *B60W 30/10* (2013.01);
(Continued)

(58) Field of Classification Search
CPC ..... B62D 15/025; B60W 30/10; B60W 30/12; B60W 40/072; B60W 2550/146
See application file for complete search history.

(56) References Cited

U.S. PATENT DOCUMENTS 5,208,750 A  *  5/1993  Kurami ................ G05D 1/0251
                                                              180/168
8,583,366 B2     11/2013  Iida
(Continued)

FOREIGN PATENT DOCUMENTS

JP       04353908 A  *  12/1992
JP       08144208 A  *  6/1996
(Continued)

OTHER PUBLICATIONS

JPO machine translation of JP 2005-182186 (original JP document published Jul. 7, 2005).*

*Primary Examiner* — Behrang Badii
*Assistant Examiner* — David Testardi
(74) *Attorney, Agent, or Firm* — Sughrue Mion, PLLC

(57) ABSTRACT

A driving support apparatus includes: a travel possible region detecting device configured to detect a travel possible region of a vehicle; a travel controller configured to carry out locus control based on a target locus; and a controller configured to decide a road center of a curve, which is located forward of a traveling direction by a pre-read distance which is set according to a vehicle speed of the vehicle from a driver's own vehicle position of the vehicle, as a reference point, at the time the curve exists forward of the traveling direction, decide a position offset from the reference point to inside of the curve by a lateral displacement which is set according to a radius of curvature of the curve at the reference point, as a target point, and create the target locus so as to pass through the driver's own vehicle position and the target point.

8 Claims, 13 Drawing Sheets

(51) Int. Cl.
*B60W 30/02* (2012.01)
*B60W 40/072* (2012.01)

(52) U.S. Cl.
CPC ......... *B60W 40/072* (2013.01); *B62D 15/021* (2013.01); *B60W 2520/10* (2013.01); *B60W 2550/146* (2013.01)

(56) References Cited

U.S. PATENT DOCUMENTS

| | | | |
|---|---|---|---|
| 9,096,266 B2* | 8/2015 | Irie | B60W 30/10 |
| 2009/0171533 A1* | 7/2009 | Kataoka | B60W 30/12 |
| | | | 701/41 |
| 2010/0004821 A1* | 1/2010 | Buerkle | B62D 15/025 |
| | | | 701/41 |
| 2010/0036563 A1* | 2/2010 | Inou | B60W 10/20 |
| | | | 701/41 |
| 2010/0100284 A1* | 4/2010 | Kudo | B62D 15/025 |
| | | | 701/42 |
| 2010/0211235 A1* | 8/2010 | Taguchi | B60T 7/22 |
| | | | 701/1 |
| 2011/0218724 A1* | 9/2011 | Iida | G01C 21/32 |
| | | | 701/70 |
| 2011/0231062 A1* | 9/2011 | Kim | B62D 15/025 |
| | | | 701/41 |
| 2012/0303258 A1* | 11/2012 | Pampus | B60W 30/0956 |
| | | | 701/301 |
| 2013/0006473 A1* | 1/2013 | Buerkle | B60W 30/045 |
| | | | 701/41 |
| 2015/0109429 A1 | 4/2015 | Inoue et al. | |

FOREIGN PATENT DOCUMENTS

| | | | | |
|---|---|---|---|---|
| JP | 2004206275 A | * | 7/2004 | |
| JP | 2005182186 A | * | 7/2005 | |
| JP | 2008-030617 A | | 2/2008 | |
| JP | 2008-062672 A | | 3/2008 | |
| JP | 2009-208682 A | | 9/2009 | |
| JP | 2009-234543 A | | 10/2009 | |
| JP | 2011016418 A | * | 1/2011 | |
| JP | 2011183995 A | * | 9/2011 | |
| JP | 2011-203240 A | | 10/2011 | |
| JP | 2014-016702 A | | 1/2014 | |
| WO | WO 2011/110156 A2 | * | 9/2011 | |

* cited by examiner

| | |
|---|---|
| RADIUS OF CURVATURE | : 450 (m) |
| RELAXATION LENGTH | : 70 (m) |
| TRAVEL SPEED | : 80 (km/h) |
| PRE-READ DISTANCE | : 80 (m) |
| LOCUS UPDATE | : AT THE TIME OF USE OF 50 % |
| TARGET POINT LATERAL POSITION | : 58 (cm) @ 450 R |

# DRIVING SUPPORT APPARATUS AND DRIVING SUPPORT METHOD

CROSS REFERENCE TO RELATED APPLICATIONS

This is a National Stage of International Application No. PCT/JP2014/062291 filed Apr. 28, 2014, claiming priority based on Japanese Patent Application No. 2013-096505 filed May 1, 2013, the contents of all of which are incorporated herein by reference in their entirety.

TECHNICAL FIELD

The present invention relates to a driving support apparatus and a driving support method.

BACKGROUND ART

Conventionally, there is a technology for causing a vehicle to automatically travel along a target locus.

For example, Patent Literature 1 discloses a technology for setting a target travel line nearer to inside of a curve depending on a direction of driver's line of sight when a driver goes along the curve. Patent Literature 2 discloses a technology for setting a correction value based on an out-in-out path detected in a curve and studying a curve shape corrected by the correction value as curve information. Patent Literature 3 discloses to travel along a curve in out-in-out and further discloses a technology for increasing a deviation warning determination line in the curve.

CITATION LIST

Patent Literatures

Patent Literature 1: Japanese Patent Application Laid-open No. 2008-030617
Patent Literature 2: Japanese Patent Application Laid-open No. 2011-203240
Patent Literature 3: Japanese Patent Application Laid-open No. 2009-234543

DISCLOSURE OF INVENTION

Problems to be Solved by the Invention

Incidentally, the conventional technologies have a room for improvement in the point of setting a target locus ideal to a driver when traveling along a curve by automatic driving.

An object of the invention, which was made in view of the circumstances, is to provide a driving support apparatus and a driving support method capable of setting a target locus for reducing uncomfortable feeling felt by a driver when traveling along a curve by the automatic driving.

Solution to the Problems

A driving support apparatus according to the present invention includes a travel possible region detecting device configured to detect a travel possible region of a vehicle; a travel controller configured to carry out locus control based on a target locus, which is created to cause the vehicle to travel in the travel possible region detected by the travel possible region detecting device; and a controller configured to decide a road center of a curve, which is located forward of a traveling direction by a pre-read distance set according to a vehicle speed of the vehicle from a driver's own vehicle position of the vehicle, as a reference point, at the time the curve exists forward of the traveling direction of the vehicle, decide a position offset from the reference point to inside of the curve by a lateral displacement which is set according to a radius of curvature of the curve at the reference point, as a target point, and create the target locus so as to pass through the driver's own vehicle position and the target point.

In the driving support apparatus, it is preferable that a faster vehicle speed sets the pre-read distance longer.

In the driving support apparatus, it is preferable that a larger radius of curvature of the curve sets the lateral displacement smaller.

In the driving support apparatus, it is preferable that at the time the vehicle has traveled along the target locus from a location where the target locus had been created by a predetermined locus update ratio, the controller creates a new target locus again.

In the driving support apparatus, it is preferable that the locus update ratio for creating the target locus again is set according to a road shape.

In the driving support apparatus, it is preferable that the road shape is decided by a change ratio of the radius of curvature of the curve.

In the driving support apparatus, it is preferable that at the time the driver's own vehicle position of the vehicle is located in an outside region of the travel possible region, the controller changes the target point to the road center side.

In the driving support apparatus, it is preferable that at the time a peripheral object exists on an adjacent traffic lane in the pre-read distance from the driver's own vehicle position of the vehicle, the controller changes the target point in a direction away from the peripheral object in the travel possible region.

Further, a driving support method according to the present invention is carried out in a driving support apparatus including a travel possible region detecting device configured to detect a travel possible region of a vehicle, a travel controller configured to carry out locus control based on a target locus, which is created to cause the vehicle to travel in the travel possible region detected by the travel possible region detecting device, and a controller configured to carry out various controls. Wherein, the driving support method includes a reference point decision step configured to decide a road center of a curve, which is located forward of a traveling direction from a driver's own vehicle position of the vehicle by a pre-read distance which is set according to a vehicle speed of the vehicle, as a reference point, at the time the curve exists forward of the traveling direction of the vehicle; a target point decision step configured to decide a position offset from the reference point to inside of the curve by a lateral displacement which is set according to a radius of curvature of the curve at the reference point decided at the reference point decision step, as a target point; and a target locus creation step configured to create the target locus so as to cause the target locus to pass through the driver's own vehicle position and the target point. Wherein, the above steps are carried out by the controller.

Effects of the Invention

The driving support apparatus and the driving support method according to the invention achieve an effect that the target locus ideal to a driver can be set when traveling along a curve by the automatic driving.

DESCRIPTION OF EMBODIMENTS

An embodiment according to the invention will be explained below in detail based on the drawings. Note that the invention is not limited by the embodiment. Further, components in the embodiment include components that can be easily replaced by a person skilled in the art and are easy or substantially the same components.

Embodiment

A configuration of a vehicle controller according to an embodiment will be explained referring to FIG. 1 to FIG. 20.

Figure 1:
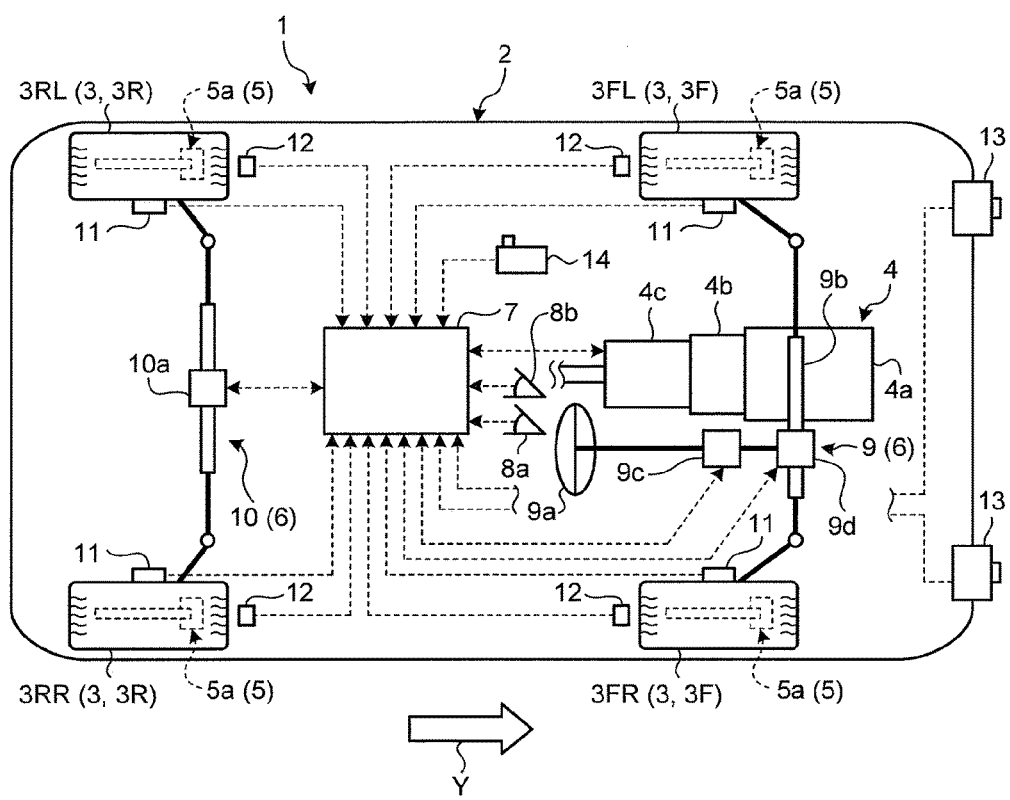
FIG. 1 is a schematic configuration view of a vehicle to which a driving support apparatus according to an embodiment is applied.

FIG. 1 is a schematic configuration view of a vehicle 2 to which a driving support apparatus 1 according to the embodiment is applied.

As illustrated in FIG. 1, the driving support apparatus 1 of the embodiment is mounted on the vehicle 2 employing four wheel steering. Note that the vehicle 2 travels forward in an arrow Y-direction of FIG. 1. The direction in which the vehicle 2 travels forward is a direction from a driver's seat on which a driver of the vehicle 2 sits toward a steering wheel. Right and left are discriminated using the direction in which the vehicle 2 travels forward (the arrow Y-direction of FIG. 1) as a reference. That is, "left" is defined as a left side toward a direction in which the vehicle 2 travels forward and "right" is defined as a right side toward a direction in which the vehicle 2 travels forward. Further, as to forward and backward of the vehicle 2, the direction in which the vehicle 2 travels forward is defined as forward and the direction in which the vehicle 2 travels backward, i.e. a direction opposite to the direction in which the vehicle 2 travels forward is defined as backward.

The vehicle 2 includes, as wheels 3, a front left wheel (a front left side wheel 3) 3FL, a front right wheel (a front right side wheel 3) 3FR, a rear left wheel (a rear left side wheel 3) 3RL, and a rear right wheel (a rear right side wheel 3) 3RR. Note that, in the following explanation, when it is not particularly necessary to individually explain the front left wheel 3FL, the front right wheel 3FR, the rear left wheel 3RL, and the rear right wheel 3RR, they may be simply called "wheels 3". Further, in the following explanation, when it is not particularly necessary to individually explain the front left wheel 3FL and the front right wheel 3FR, they may be simply called "front wheels 3F". Likewise, in the following explanation, when it is not particularly necessary to individually explain the rear left wheel 3RL and the rear right wheel 3RR, they may be simply called "rear wheels 3R".

The driving support apparatus 1 is an apparatus on which a steering device 6, etc. as a steering actuator, which can steer the front wheels 3F and the rear wheels 3R of the vehicle 2, is mounted. The driving support apparatus 1 typically carries out vehicle control in the vehicle 2 including a steering device 6 that is a 4 wheel steering mechanism composed of a front wheel steering device 9 and a rear wheel steering device 10.

As illustrated in FIG. 1, the driving support apparatus 1 includes a drive device 4, brake devices 5, the steering device 6, and an ECU (Electronic Control Unit) 7 as a controller.

In the vehicle 2, the drive device 4 configures a power train including a power source 4a, a torque converter 4b, and a transmission 4c and drives the wheels 3 acting as driving wheels in rotation. The power source 4a generates rotation power for causing the vehicle 2 to travel and is a traveling power source such as an internal combustion engine (an engine) and an electric motor (a rotary machine). The drive device 4 transmits the rotation power generated by the power source 4a from the power source 4a to the wheels 3 (for example, the rear left wheel 3RL and the rear right wheel 3RR as the driving wheels) via the torque converter 4b and the transmission 4c. The drive device 4 is electrically connected to the ECU 7 and controlled by the ECU 7. In the vehicle 2, the drive device 4 generates power (torque) according to operation of an accelerator pedal 8a (accelerator operation) by the driver and the power is transmitted to the wheels 3 so that a driving force is generated to the wheels 3. In the embodiment, the drive device 4 functions as a part of a travel controller that carries out locus control by acceleration control based on a target locus created so as to cause the vehicle 2 to travel in a travel possible region detected by forward detectors 13 to be described later.

The brake devices 5 generate brake forces to the wheels 3 in the vehicle 2. The brake devices 5 include brake units 5a disposed to the wheels 3, respectively. The respective brake units 5a apply the brake forces generated by friction to the respective wheels 3 of the vehicle 2 and are, for example, hydraulic brake devices. The respective brake units 5a operate according to wheel cylinder pressure generated by brake oil supplied to wheel cylinders and generate pressure brake forces to the wheels 3. In the brake devices 5, master cylinder pressure is applied to the brake oil by a master cylinder according to operation (brake operation) of a brake pedal 8b by the driver. In the brake devices 5, pressure according to the master cylinder pressure or pressure adjusted by a hydraulic pressure controller acts in the respective wheel cylinders as the wheel cylinder pressure. In each brake unit 5a, a brake pad supported by a caliper by the wheel cylinder pressure is abutted to and pressed against a disk rotor so that an abutment surface between the brake pad and the disk rotor becomes a friction surface. In each brake unit 5a, a predetermined rotation resistance force according to the wheel cylinder pressure acts on the disk rotor that rotates together with a wheel 3 by a friction force generated to the friction surface so that a brake force generated by friction can be applied to the wheels 3. In the embodiment, the brake devices 5 function as a part of the travel controller that carries out the locus control by deceleration control based on the target locus, which is created to cause the vehicle 2 to travel in the travel possible region detected by the forward detectors 13 to be described later.

The steering device 6 can steer the front wheels 3F and the rear wheels 3R of the vehicle 2 and is configured including a front wheel steering device 9 and a rear wheel steering device 10. The front wheel steering device 9 can steer the front wheels 3F of the vehicle 2 and steers the front left wheel 3FL and the front right wheel 3FR as wheels to be steered. The rear wheel steering device 10 can steer the rear wheels 3R of the vehicle 2 and steers the rear left wheel 3RL and the rear right wheel 3RR as wheels to be steered. In the embodiment, the steering device 6 functions as a part of the travel controller that carries out the locus control by steering control based on the target locus, which is created to cause the vehicle 2 to travel in the travel possible region detected by the forward detectors 13 to be described later.

Note that, in the following explanation, the drive device 4, the brake devices 5, and the steering device 6 described above may be called the travel controller. Namely, the travel controller of the embodiment has a function for carrying out the locus control by at least one of the steering control and an acceleration/deceleration control based on the target locus, which is created to cause the vehicle 2 to travel in the travel possible region detected by the forward detectors 13 to be described later.

The front wheel steering device 9 includes a steering wheel (a handle) 9a as a steering member that is a steering operation device operated by the driver and a steering angle application mechanism 9b that is driven by the steering operation of the steering wheel 9a and steers the front wheels 3F. Although the steering angle application mechanism 9b can use, for example, a so-called rack & pinion mechanism provided with a rack gear and a pinion gear, it is not limited thereto. Further, the front wheel steering device 9 is configured including a VGRS (Variable Gear Ratio Steering) device 9c disposed between the steering wheel 9a and the steering angle application mechanism 9b,
a front wheel steering driver (booster) 9d, etc. The VGRS device 9c is a gear ratio variable steering mechanism capable of changing a gear ratio of the steering wheel 9a. The front wheel steering device 9 can change a steering angle of the front wheels 3F (hereinafter, may be called "front wheel steering angle") to a handle steering angle MA (a turning angle) that is an operation amount of the steering wheel 9a according to a vehicle status of the vehicle 2 (for example, a vehicle speed V that is a travel speed of the vehicle 2) by, for example, the VGRS device 9c. The steering driver (a steering assist device) 9d is a so-called electrically driven power assist steering device (an EPS (Electric Power assist Steering) device) for assisting a steering force applied from the driver to the steering wheel 9a by power (a steering assistant force) of an electric motor, etc. The front wheel steering device 9 is electrically connected to the ECU 7 and the VGRS device 9c, the steering driver 9d, etc. are controlled by the ECU 7.

The rear wheel steering device 10 is a so-called ARS (Active Rear Steering) device. The rear wheel steering device 10 includes steering driver 10a for a rear wheel, that is driven by power of an electric motor, etc. and steers the rear wheels 3R. Likewise the front wheel steering device 9, the rear wheel steering device 10 can change a steering angle of the rear wheels 3R (hereinafter, may be called "rear wheel steering angle") to the handle steering angle MA according to the vehicle status of the vehicle 2 (for example, the vehicle speed V) by, for example, the steering driver 10a. The rear wheel steering device 10 is electrically connected to the ECU 7 and the steering driver 10a, etc. are controlled by the ECU 7. The rear wheel steering device 10 steers the rear wheels 3R by, for example, the ECU 7 at the same phase as or an inverted phase of the steering angle of the front wheels 3F according to the vehicle status of the vehicle 2 (for example, the vehicle speed V and a turning state).

As described above, in the driving support apparatus 1, the steering device 6 is composed of the front wheel steering device 9 and the rear wheel steering device 10 and the rear left wheel 3RL and the rear right wheel 3RR also become the wheels to be steered together with the front left wheel 3FL and the front right wheel 3FR. Further, the front wheel steering device 9 and the rear wheel steering device 10 can also change steering angles of the front wheels 3F and the rear wheels 3R independently of the steering operation by the driver under control of the ECU 7.

Further, the steering device 6 is also an actuator capable of adjusting a vehicle body slip angle $\beta$ of the vehicle 2. The vehicle body slip angle $\beta$ is an angle formed between a front-back direction center line of the vehicle body of the vehicle 2 (a vehicle body direction) and a traveling direction (speed vector) of the vehicle body of the vehicle 2 and is, for example, an angle formed by the front-back direction center line of the vehicle body of the vehicle 2 to a turning tangential direction of the vehicle 2. In the vehicle body slip angle $\beta$, for example, a status that the front-back direction center line of vehicle body agrees with a vehicle body traveling direction is shown by 0 [rad]. The vehicle body slip angle $\beta$ is decided according to, for example, a front wheel steering angle $\delta_f$, a rear wheel steering angle $\delta_r$ of the vehicle 2, etc. The steering device 6 can adjust the vehicle body slip angle $\beta$ of the vehicle 2 by adjusting the front wheel steering angle $\delta_f$ and the rear wheel steering angle $\delta_r$.

The ECU 7 is a controller for controlling a drive of respective portions of the vehicle 2 and is configured including an electronic circuit mainly composed of a known microcomputer including a CPU, ROM, RAM, and an interface. The ECU 7 is electrically connected with, for example, sensors and detectors and is input with an electric signal corresponding to a result of detection. The ECU 7 outputs a drive signal to respective portions of the vehicle 2 such as the drive device 4, the brake devices 5, the steering device 6, etc. by carrying out a control program stored therein based on various input signals and various maps input from the various sensors and detectors to thereby control the drive of them. In the following explanation, the ECU 7 may be called "controller".

The driving support apparatus 1 of the embodiment includes, as the various sensors and detectors, for example, wheel speed sensors 11, wheel cylinder pressure sensors 12, the forward detectors 13, a GPS information receiver 14, etc.

One set of the wheel speed sensor 11 is disposed to each of the front left wheel 3FL, the front right wheel 3FR, the rear left wheel 3RL, and the rear right wheel 3RR, i.e. four sets of the wheel speed sensors 11 are disposed in total. The respective wheel speed sensors 11 detect wheel speeds that are rotation speeds of the front left wheel 3FL, the front right wheel 3FR, the rear left wheel 3RL, and the rear right wheel 3RR, respectively. The ECU 7 can calculate the vehicle speed V that is the travel speed of the vehicle 2 based on the wheel speeds of the respective wheels 3 that is input from the respective wheel speed sensors 11.

One set of the wheel cylinder pressure sensors 12 is disposed to the brake unit 5a of each of the front left wheel 3FL, the front right wheel 3FR, the rear left wheel 3RL, and the rear right wheel 3RR, i.e., four sets of the wheel cylinder pressure sensors 12 are disposed in total. The respective wheel cylinder pressure sensors 12 detect wheel cylinder pressure of the respective brake units 5a of the front left wheel 3FL, the front right wheel 3FR, the rear left wheel 3RL, and the rear right wheel 3RR, respectively.

The forward detectors 13 detects a status forward of a traveling direction of the vehicle 2 (a direction along a forward traveling direction Y). The forward detectors 13 may use an image recognizer, etc. for detecting the status forward of the traveling direction of the vehicle 2 by analyzing image data in which forward of the vehicle 2 in the traveling direction is picked up by, for example, a millimeter wave radar, a radar using laser, infrared rays, etc., a short distance radar such as a UWB (Ultra Wide Band) radar, a sonar using a sound wave in an audible range or an ultrasonic wave, and an image pick-up device such as a CCD camera. Note that each of the forward detectors 13 may be provided with a radar or a camera.

The forward detectors 13 detects at least one of, for example, the presence or absence of a peripheral object (an obstacle, a forward traveling vehicle, etc.) forward of the vehicle 2 in the traveling direction, a relative physical quantity showing a relative positional relation between the detected peripheral object and the vehicle 2, a shape of a road on which the vehicle 2 travels (straight, curve, etc.), a traveling lane (lane), etc. as the status forward of the traveling direction of the vehicle 2.

In the embodiment, the forward detectors 13 function as a travel possible region detecting device that detects the travel possible region of the vehicle 2. The travel possible region is a predetermined range which is decided based on an object, for example, a white line drawn along a road, a guard rail, and a reflection plate and in which the vehicle 2 must travel while traveling and means a predetermined range regulated by a continuity of the object described above. In the following explanation, the forward detectors 13 may be called the travel possible region detecting device. Further, the travel possible region detecting device can determine whether or not the travel possible region is a curve having a curvature from a shape of the detected travel possible region.

The GPS information receiver 14 receives GPS information from a GPS satellite as position information. The GPS information receiver 14 outputs information showing a present position of the vehicle 2 based on the position information received from the GPS satellite to the ECU 7.

A function of the ECU 7 disposed to the driving support apparatus 1 of the embodiment will be explained in detail. The ECU 7 is input with an electric signal corresponding to the handle steering angle MA (the turning angle) detected by a handle steering angle sensor from the VGRS device 9c. The handle steering angle MA is a steering angle of the steering wheel 9a (a rotation angle of the steering wheel 9a). Further, the ECU 7 is input with an electric signal corresponding to the front wheel steering angle $\delta_f$ detected by a front wheel steering angle sensor from the steering driver 9d. The front wheel steering angle $\delta_f$ is a steering angle of the front wheels 3F (a rotation angle of the front wheels 3F). Likewise, the ECU 7 is input with an electric signal corresponding to the rear wheel steering angle $\delta_r$ detected by the rear wheel steering angle sensor from the steering driver 10a. The rear wheel steering angle $\delta_r$ is a steering angle of the rear wheels 3R (a rotation angle of the rear wheels 3R).

The ECU 7 changes the front wheel steering angle $\delta_f$ and the rear wheel steering angle $\delta_r$ by steering the front wheels 3F and the rear wheels 3R by controlling the front wheel steering device 9 and the rear wheel steering device 10 according to, for example, preset vehicle body slip angle characteristics of the vehicle 2. The ECU 7 calculates a target yaw ratio and a target vehicle body slip angle based on, for example, the handle steering angle MA, the vehicle speed V, etc. The target yaw ratio and the target vehicle body slip angle are the yaw ratio and the vehicle body slip angle β which are used as targets when the front wheel steering device 9 and the rear wheel steering device 10 are steered and controlled and set to values for stabilizing, for example, behavior of the vehicle 2. The ECU 7 calculates a control amount of the front wheel steering angle $\delta_f$ and a control amount of the rear wheel steering angle $\delta_r$ so that the calculated target yaw ratio and target vehicle body slip angle can be realized. The ECU 7 inversely calculates the control amounts of the front wheel steering angle $\delta_f$ and the rear wheel steering angle $\delta_r$ from the target yaw ratio and the target vehicle body slip angle using, for example, a vehicle motion model of the vehicle 2 previously stored in a storage unit. The ECU 7 outputs a control command to the front wheel steering device 9 and the rear wheel steering device 10 based on the control amounts of the front wheel steering angle $\delta_f$ and the rear wheel steering angle $\delta_r$ having been calculated. The ECU 7 feedback controls an actual front wheel steering angle $\delta_f$ and an actual rear wheel steering angle $\delta_r$ detected by the front wheel steering angle sensor of the steering driver 9d and the rear wheel steering angle sensor of the steering driver 10a and controls the front wheel steering device 9 and the rear wheel steering device 10 so that an actual yaw ratio and an actual vehicle body slip angle β are converged to the target yaw ratio and the target vehicle body slip angle. As a result, the vehicle 2 can travel while the front wheels 3F and the rear wheels 3R are steered to predetermined vehicle body slip angle characteristics by the front wheel steering device 9 and the rear wheel steering device 10.

Further, the ECU 7 can also carry out automatic drive control for causing the vehicle 2 to travel by automatic driving. The ECU 7 can carry out the automatic drive control by controlling the vehicle 2 based on, for example, a result of detection by the forward detectors 13. The automatic drive control is the locus control for creating the target locus based on, for example, the result of detection by the forward detectors 13 and controlling the drive device 4, the brake devices 5, and the steering device 6 (the front wheel steering device 9 and the rear wheel steering device 10) as the travel controller so that the vehicle 2 travels along the target locus. The ECU 7 creates the target locus that is a traveling locus as a target of the vehicle 2 in the travel possible region based on the presence or absence of the peripheral object forward of the vehicle 2 in the traveling direction detected by the forward detectors 13, the relative physical quantity between the peripheral object and the vehicle 2, the shape of the road on which the vehicle 2 travels, the traveling lane (the lane), the guard rail, etc. The ECU 7 creates the target locus of the vehicle 2 according to, for example, a traveling locus for causing the vehicle 2 that is a driver's own vehicle to travel while keeping the vehicle 2 in the traveling lane at the time (a lane keeping assist), a traveling locus for avoiding an obstacle forward of the vehicle 2 in the traveling direction, and a traveling locus for causing the vehicle 2 to travel following a forward traveling vehicle. The driving support apparatus 1 can optionally turn on and off the automatic drive control (the locus control) in response to an intention of the driver according to, for example, switching operation of the driver via a predetermined changeover switch.

When, for example, the automatic drive control is carried out, the ECU 7 specifies the driver's own vehicle position by a way distance on a map obtained by a GPS, cumulated wheel pulses, and a position in a road partition obtained by analyzing a picked-up image. The ECU 7 creates the target locus along which the vehicle 2 must travel from the road information forward of the traveling direction using map information including road information such as a curve R, cant information, road partition line width, etc. (which may be called "locator information" below). The travel controller carries out lane keeping assist control along the target locus created by the ECU 7. As described above, the driving support apparatus 1 of the embodiment has a function for creating the target locus based on the analysis of the picked-up image and the map information and carrying out the locus control along the target locus by automatically controlling a steering angle of the vehicle 2.

Figure 2:
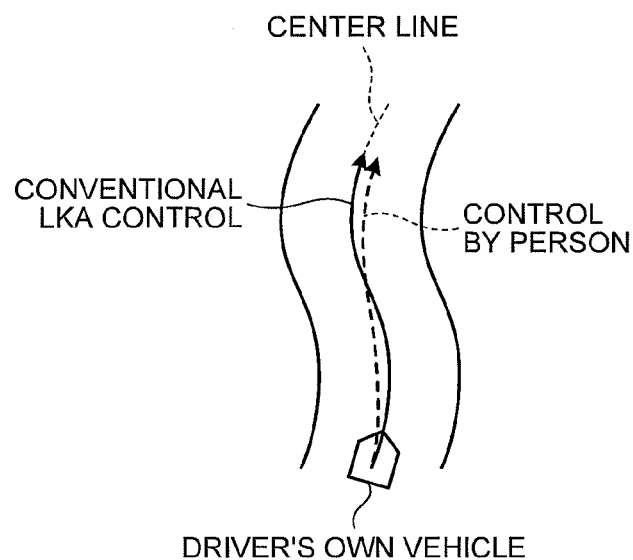
FIG. 2 is a view explaining an example of uncomfortable feeling felt by a driver when aiming at a lane center as a target.
Figure 3:
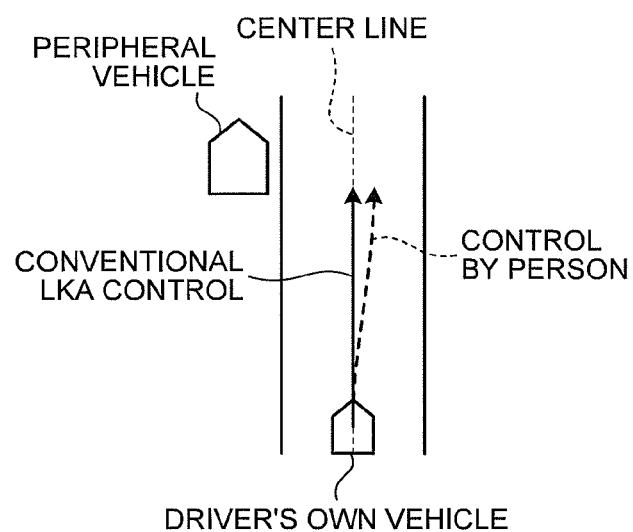
FIG. 3 is a view explaining an example of uncomfortable feeling felt by the driver when setting a lane center as the target.
Figure 4:
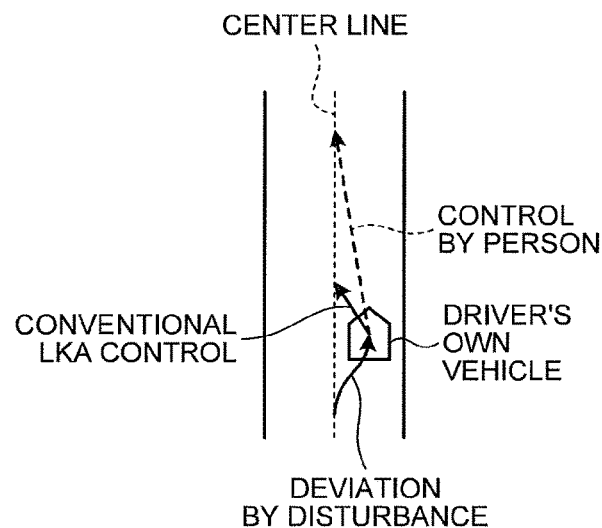
FIG. 4 is a view explaining an example of uncomfortable feeling felt by the driver when setting a lane center as the target.

Conventionally, a control system for recognizing a road section line such as a white line from an image picked up by a camera and controlling a steering angle so that a driver's own vehicle travels in a traveling lane sectioned by road partition lines on both the sides of the driver's own vehicle has come into practical use under the name of a lane keeping assist (LKA). In the LKA, a road center line is calculated from the road partition lines on both the sides of the driver's own vehicle and feedback control is carried out so that the driver's own vehicle travels on the road center line. However, in the conventional LKA, there is thought a status that the driver feels uncomfortable feeling by carrying out the feedback control so that the driver's own vehicle travels on the road center line as illustrated in FIG. 2 to FIG. 4. FIG. 2 to FIG. 4 are views explaining an example of the uncomfortable feeling felt by the driver when setting a lane center as a target.

In, for example, the conventional LKA, when traveling along a curve as illustrated in FIG. 2, the driver's own vehicle travels on a center line or somewhat outside of the center line. In particular, in the traveling along a somewhat sharp curve having a radius of curvature that is small to some extent, there is a high possibility that the driver feels uncomfortable feeling as if he or she delays to turn a steering wheel by that the driver's own vehicle travels on the center line or outside of the center line. In contrast, in control by a person, when traveling along the curve, uncomfortable feeling is reduced by traveling inside of the curve.

Further, in the conventional LKA, as illustrated in FIG. 3, since the driver's own vehicle continuously travels on the center line even if other vehicle exists in the periphery of the driver's own vehicle, there is a high possibility that uncomfortable feeling such as oppressive feeling is felt. In contrast, in the control by the person, when a peripheral vehicle such as, for example, a large truck and a vehicle having somewhat doubtful behavior is overtaken, uncomfortable feeling is reduced by making a lateral vehicular distance to the peripheral vehicle longer than a distance between peripheral vehicle and the road center line.

Further, in the conventional LKA, as illustrated in FIG. 4, when the vehicle is deviated from the center line by a disturbance such as lateral wind, although the vehicle is controlled to promptly return to the center line unexceptionally, uncomfortable feeling is reduced in many cases by rather gently returning the vehicle to the center line depending on a travel status as in the control by the person.

To cope with the problem, the driving support apparatus 1 of the embodiment sets a target locus for reducing an uncomfortable feeling of the driver as in the control by the person illustrated in FIG. 2 to FIG. 4 described above.

Figure 5:
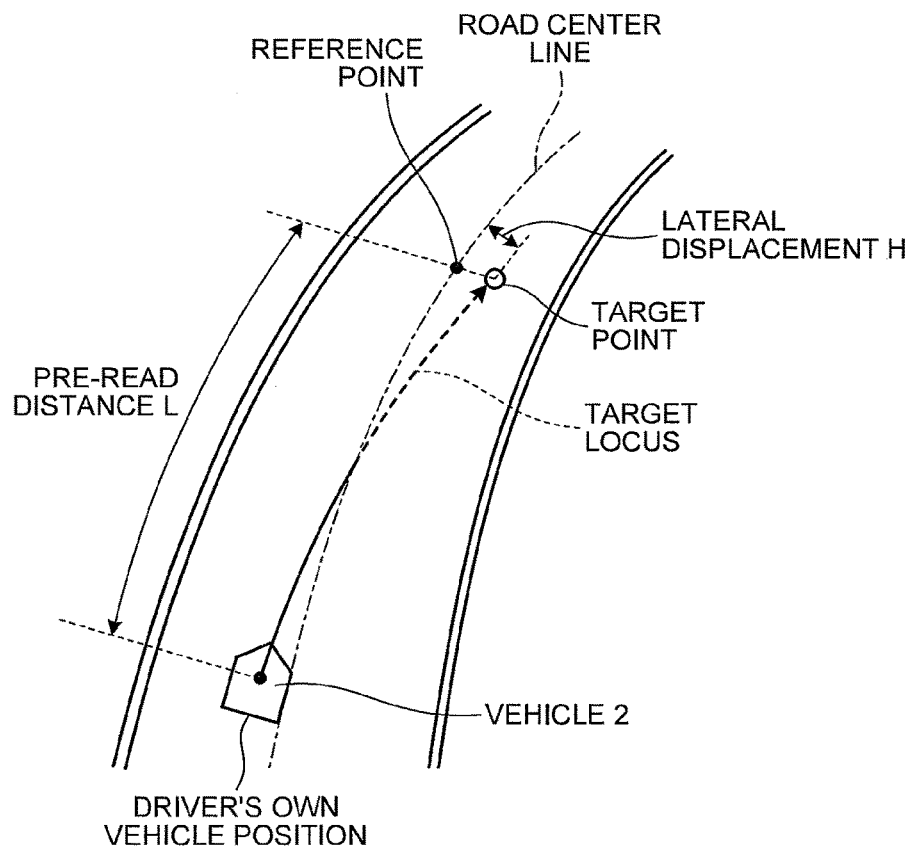
FIG. 5 is a view illustrating an example of a target locus created by the embodiment.
Figure 6:
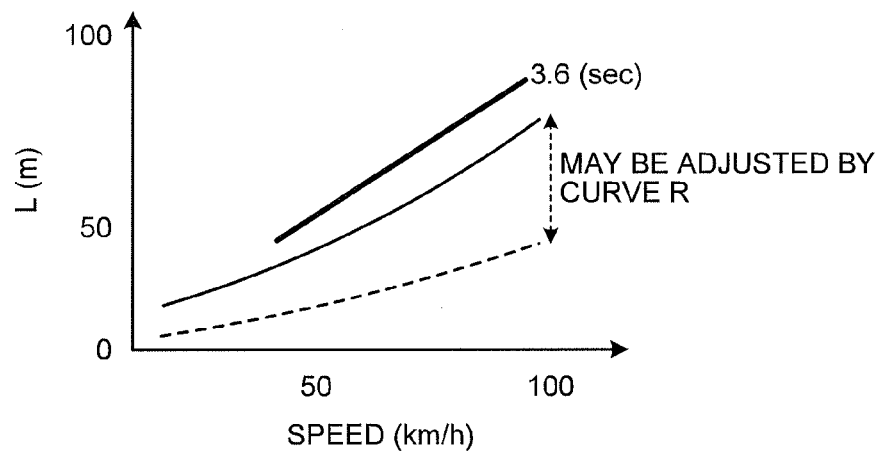
FIG. 6 is a view illustrating an example of a relation between a pre-read distance and a speed.
Figure 7:
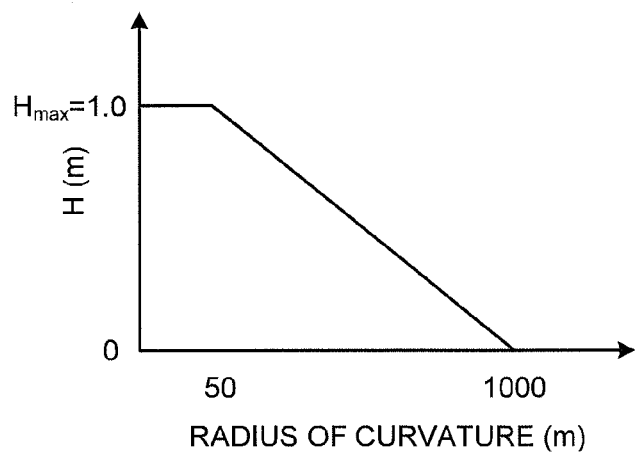
FIG. 7 is a view illustrating an example of a relation between a lateral displacement and a radius of curvature.
Figures 8, 9:
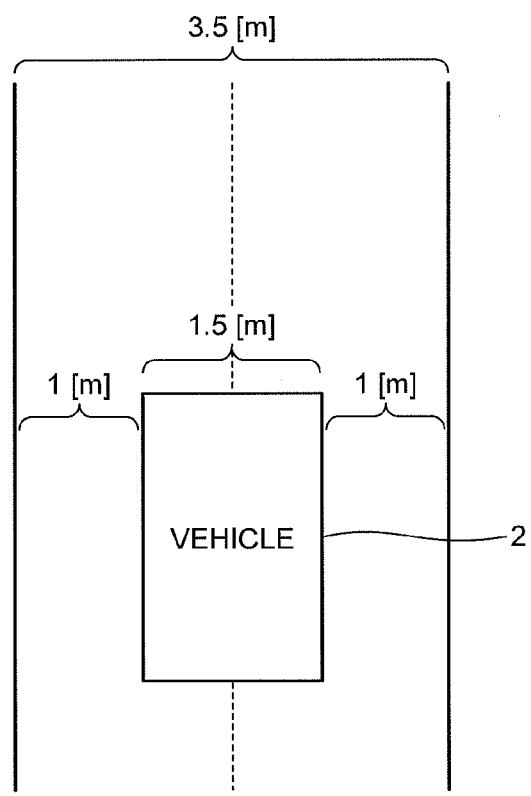
FIG. 8 is a view explaining an example of a maximum value of the lateral displacement.
FIG. 9 is a view illustrating an example of conditions of locus control.

A setting process for setting the target locus in the embodiment will be explained below in detail referring to FIG. 5 to FIG. 8 using a case that traveling is carried out along a curve as an example. FIG. 5 is a view illustrating an example of the target locus created in the embodiment. FIG. 6 is a view illustrating an example of a relation between a pre-read distance L and a speed. FIG. 7 is a view illustrating an example of a relation between a lateral displacement H and a radius of curvature. FIG. 8 is a view explaining an example of the maximum value of the lateral displacement H.

As illustrated in, for example, FIG. 5, when a curve exists forward of the traveling direction of the vehicle 2, a controller of the driving support apparatus 1 decides a road center of the curve, which is located forward of the traveling direction by the pre-read distance L which is set according to a vehicle speed of the vehicle 2 from the position of the driver's own vehicle 2, as a reference point. The controller decides a position offset from the reference point to inside of the curve by the lateral displacement H set according to a radius of curvature of the curve at the decided reference point as a target point. The controller creates the target locus so that it passes through the driver's own vehicle position and the target point. Specifically, the controller creates the target locus that gradually changes the lateral displacement H along a road alignment. Thereafter, the controller carries out the locus control based on the created target locus by controlling the travel controller.

In the embodiment, the pre-read distance L is set to a value corresponding to a distance forward of the traveling direction which the driver sees while driving the vehicle 2. As illustrated in FIG. 6, the value of the pre-read distance L is set according to the vehicle speed of the vehicle 2. In, for example, the example of FIG. 5, the pre-read distance L is set to 3.6 seconds. This is because when the vehicle 2 travels at the travel speed of 100 km per hour in the example of FIG. 5, it is anticipated that the driver of the vehicle 2 sees a traveling direction 100 m forward of him or her. Referring to FIG. 6, the pre-read distance L of 100 m corresponds to a distance when the vehicle 2 has travelled for 3.6 seconds at 100 km per hour. Note that, according to Literature "Review of Driver's Preview Behavior, Hagiwara and Hamaoka, Proceedings of JSAE, 2012", the pre-read distance L (expressed as a prediction time in Literature) is set to 3 to 5 seconds, and it is thought proper to set the pre-read distance L therebetween. Further, as illustrated in FIG. 6, a faster vehicle speed sets the pre-read distance L longer. Further, since it is thought that the driver sees a position nearer in the pre-read distance L when the vehicle travels on a curve than when the vehicle 2 travels on a straight road, the pre-read distance L may be adjusted according to the curve R. For example, a sharper curve adjusts the pre-read distance L shorter. This is because the sharper curve makes a distance, which can be seen by the driver, forward in the traveling direction shorter.

As illustrated in FIG. 7, a larger radius of curvature of the curve at the reference point sets the lateral displacement H smaller. In the example illustrated in FIG. 7, when the radius of curvature is 1000 m, the lateral displacement H is set to a minimum value of 0 m. This is because it can be judged that the radius of curvature having a larger value makes the curve gentler and that the curve having the radius of curvature of 1000 m is substantially near to a straight road. Namely, this is because when it can be judged that the curve is substantially near to the straight road, it is thought that the uncomfortable feeling of the driver can be more reduced by setting the target point when the target locus is created to the road center without offsetting the target point inside of the curve. In contrast, when the radius of curvature is 50 m, the lateral displacement H is set to a maximum value 1.0 m. This is because since the radius of curvature having a smaller value makes the curve sharper and when the radius of curvature is 50 m, the curve becomes considerably sharper, the uncomfortable feeling of the driver can be reduced by that the driver passes through inside of the curve as much as possible.

The maximum value Hmax=1.0 m of the lateral displacement H is set as described below. As illustrated in, for example, FIG. 8, when a road width is 3.5 m and a vehicle width is 1.5 m, since an allowance in which the vehicle 2 can move at the time in a lateral direction is 1 m on the right and left sides thereof, the value is set as the maximum value. Note that although the maximum value of the lateral displacement H is set to 1 m for the convenience of explanation, the value of Hmax may be changed according to the road width and the vehicle width. Further, a margin to a road side may be set. When, for example, the margin of 0.3 m is set in the setting described above, the maximum value of the lateral displacement H may be set to Hmax=0.7 m.

As described above, when traveling along the curve, the driving support apparatus 1 of the embodiment sets the target point using the target locus defined by the pre-read distance L and the lateral displacement H. Specifically, the driving support apparatus 1 sets the target locus so as to gradually change the lateral displacement H from the center line from the driver's own vehicle position to the target point. Namely, the driving support apparatus 1 sets the target point inside of the curve by the lateral displacement H from the road center forward of the pre-read distance L and sets the target locus so that the lateral displacement H from the road center changes linearly from the driver's own vehicle position to the target point.

Figure 10:
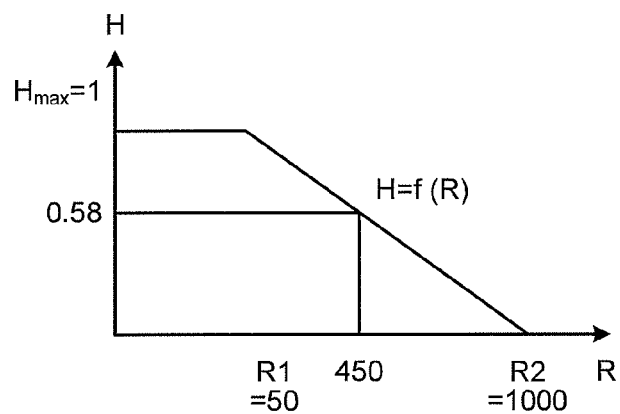
FIG. 10 is a view illustrating an example of the relation between the lateral displacement and the radius of curvature in the conditions of FIG. 9.
Figure 11:
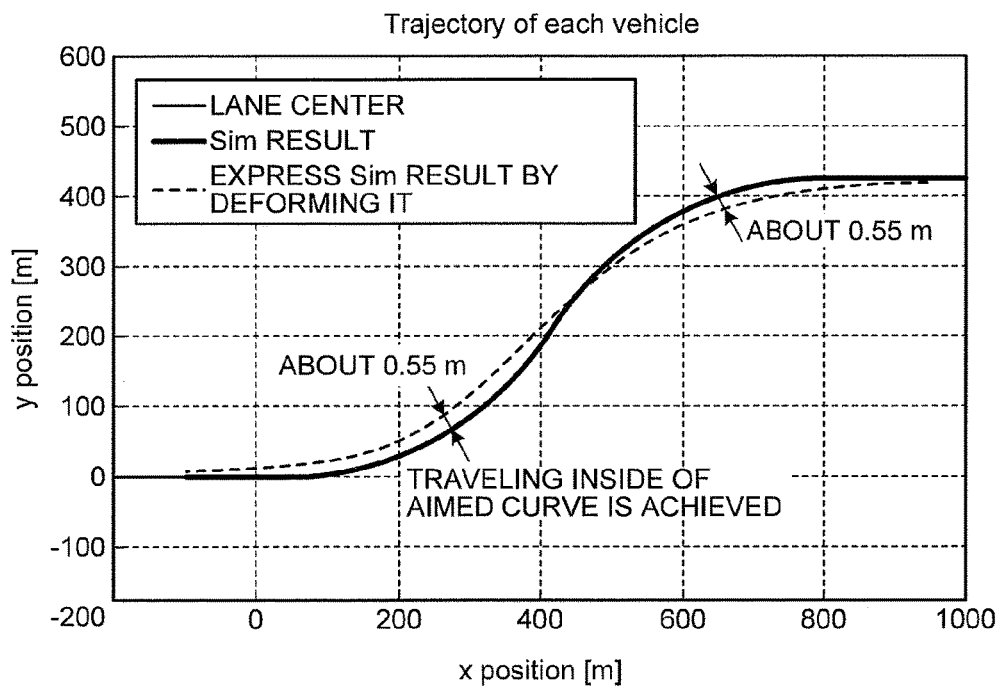
FIG. 11 is a view illustrating an example of the target locus for achieving curve inside traveling.
Figure 12:
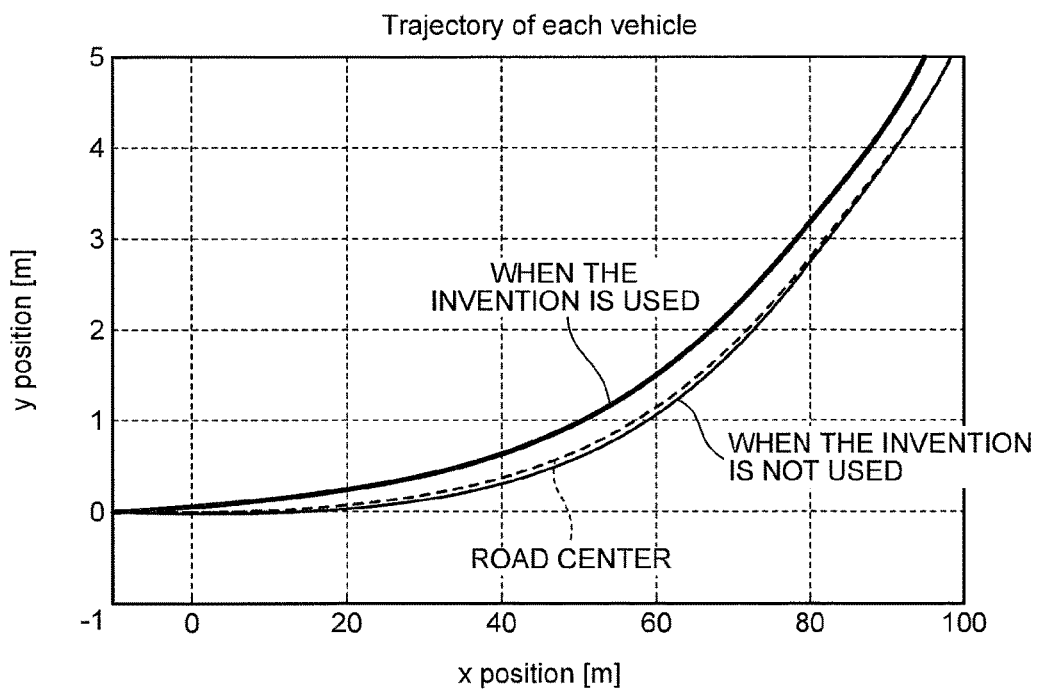
FIG. 12 is a view illustrating an example of the target locus for achieving the curve inside traveling.
Figure 13:
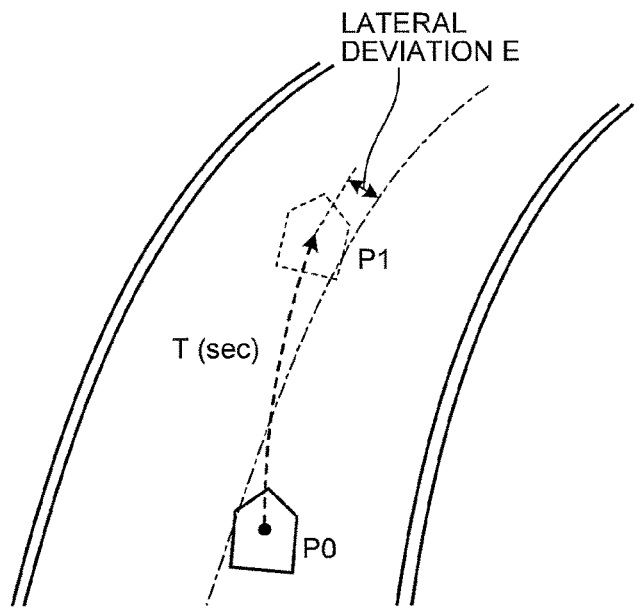
FIG. 13 is a view illustrating an example of a status in which the driver feels unsafe when traveling along a curve.
Figure 14:
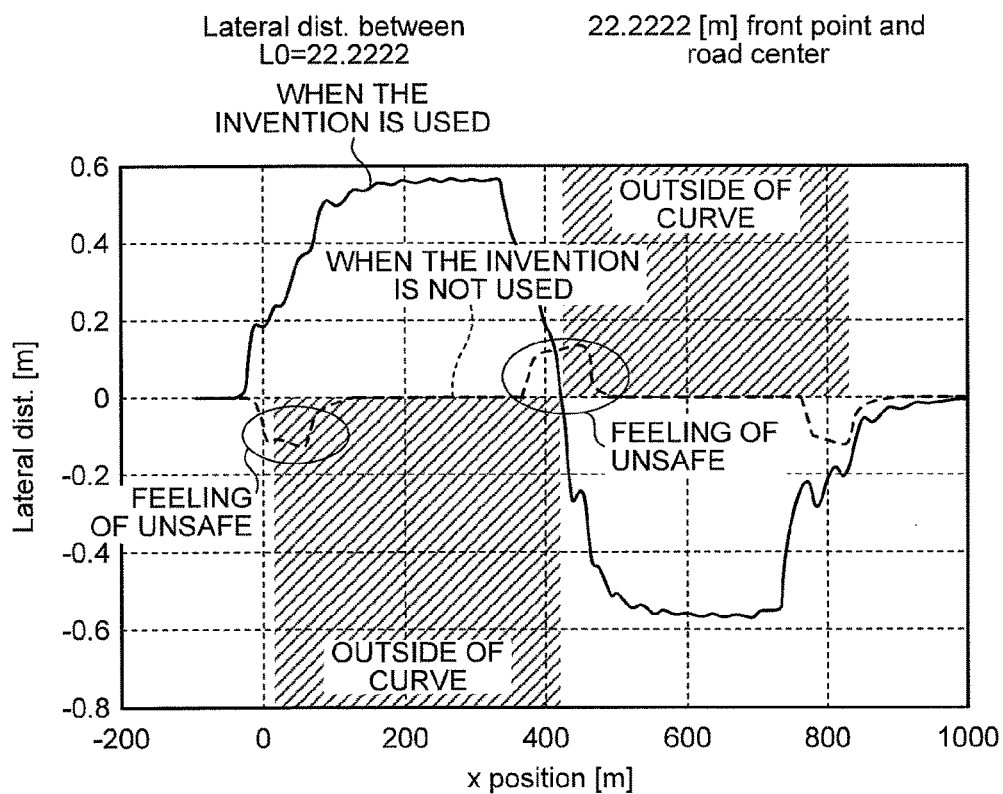
FIG. 14 is a view illustrating an example of a feeling of unsafe of the driver shown by index when traveling along the curve.

As a result, according to the embodiment, the target locus that is ideal to the driver when traveling along the curve by the automatic driving can be set as illustrated in FIG. 9 to FIG. 14. FIG. 9 is a view illustrating an example of conditions of the locus control. FIG. 10 is a view illustrating an example of the relation between the lateral displacement H and the radius of curvature in the conditions of FIG. 9. FIG. 11 is a view illustrating an example of the target locus for achieving curve inside traveling. FIG. 12 is a view illustrating an example of the target locus for achieving the curve inside traveling partly in enlargement. FIG. 13 is a view illustrating an example of a status in which the driver feels unsafe when traveling along the curve. FIG. 14 is a view illustrating an example of a feeling of unsafe of the driver shown by index when traveling along the curve.

FIG. 9 illustrates the conditions of the locus control carried out by the driving support apparatus 1 of the embodiment when traveling along curves as the example. In FIG. 9, a radius of curvature of both the S-curves along which the vehicle 2 travels is 450 m and a relaxation length is 70 m. The relaxation length shows a distance of a section in which the radius of curvature changes. When the relaxation length is 70 m, it is illustrated that the radius of curvature becomes 450 m after 70 m from a curve entrance having a radius of curvature of 0 m. Further, since a radius of curvature of an infection point of the S-curves of FIG. 9 becomes 0 m, it is illustrated that the S-curves begin to change from the radius of curvature of 450 m at a location point 70 m proximal from the infection point and becomes 0 m at the infection point. In FIG. 9, the travel speed of the vehicle 2 is 80 km/h, the pre-read distance L is 80 m, and a locus update (which may be called "locus update ratio" below) is carried out at the time of use of 50%. The locus update illustrates that a new target locus is to be created again when what degree of the target locus has been travelled in the target locus from the location point where the target locus had been created. When the locus update is carried out at the time of use of 50%, the new target locus is created again when a half of the target locus has been traveled in the created target locus. In FIG. 9, a target point lateral position is 58 cm @ 450 R. When the target point lateral position is 58 cm @ 450 R, as illustrated in FIG. 10, it is illustrated that the position of the target point is a position offset inside of the curve from the road center by the lateral displacement H of 0.58 m (58 cm) when the radius of curvature of the curve of the road center whose reference point has been decided is 450 R.

FIG. 11 illustrates a result of the locus control carried out by the driving support apparatus 1 of the embodiment when traveling along the curve. Although FIG. 11 illustrates how a simulation result (Sim result) illustrated by a thick line is offset inside of an S-curve about 0.55 m (about 55 cm) with respect to a lane center along the curve, since the thick line seems to approximately overlap the lane center in a scale of FIG. 11, FIG. 11 expresses the simulation result (Sim result) illustrated by a dotted line in deformation for the convenience of explanation. FIG. 12 illustrates the simulation result of FIG. 11 partly in enlargement. As illustrated in FIG. 12, when the invention is not used, although the target locus is set to the road center, since the feedback control is carried out to the target locus, how traveling is carried out outside of the curve with respect to the road center is illustrated as a result. In contrast, when the invention is used, how a traveling locus that is actually traveled is located inside of the curve is illustrated as a result of the traveling carried out by setting the target locus inside of the curve with respect to the road center. As described above, the driving support apparatus 1 of the embodiment can achieve the curve inside traveling that has been aimed as illustrated in FIG. 11 and FIG. 12.

Further, according to the embodiment, the feeling of unsafe of the driver when he or she approaches a curve can be also reduced. In the embodiment, the feeling of unsafe of the driver is shown by index based on a hypothesis shown below for the convenience of explanation. As illustrated in FIG. 13, it is thought that a person makes a decision whether or not he or she can turn along a curve safely at a prediction position located T seconds ahead. Namely, as illustrated in FIG. 13, it is thought that the person or the driver predicts a position P1 to which his or her vehicle has traveled from a driver's own vehicle position P0 for T seconds at a curvature of the curve at the time, and that when a lateral deviation E from a road center at the position is located outside of the curve, the driver feels unsafe such as a feeling of flying out. In view of such a way of thinking, it can be said that when the prediction position corresponding to P1 of FIG. 13 is located inside of the curve, the feeling of unsafe of the driver can be reduced.

As illustrated in FIG. 14 in which, for example, a vertical axis illustrates the prediction position corresponding to P1 of FIG. 13, although a traveling locus when the invention is not used (a dotted line in FIG. 14) approximately traces the road center, at an entrance of the curve, the prediction position is located outside of the curve. In FIG. 14, the prediction position corresponding to P1 illustrates a degree of deviation of the vehicle position in terms of the lateral displacement H from a road center line after T seconds. In FIG. 14, it can be said that a degree of swelling state of a traveling locus where prediction positions at the entrance of the curve are located outside of the curve (positions surrounded by circles in FIG. 14) illustrates the feeling of unsafe of the driver by index when he or she approaches the curve. In contrast, when the invention is used, since the vehicle begins to turn toward inside of the curve earlier, the prediction position keeps inside of the curve, which shows that a traveling locus in which no feeling of unsafe occurs (a solid line in FIG. 14) can be obtained as compared with the traveling locus when the invention is not used (the dotted line in FIG. 14). As described above, according to the embodiment, the target locus, which causes less uncomfortable feeling to the driver, is safe, and becomes a shortest distance, can be set when traveling along the curve by the automatic driving.

Figure 15:
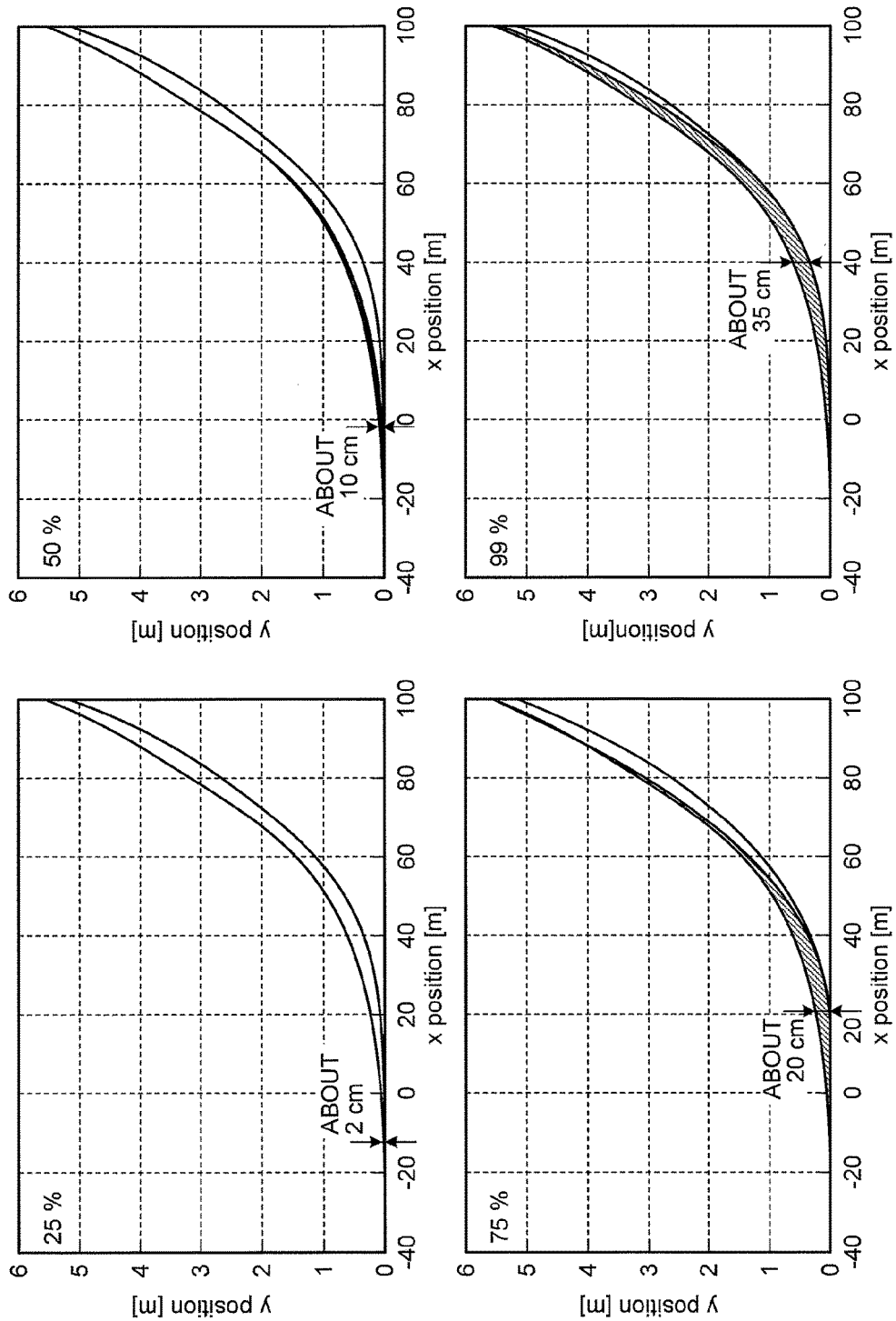
FIG. 15 is a view explaining dispersion of loci created when an initial value of an update position is changed.

The driving support apparatus 1 of the embodiment has also a function for creating a new target locus when the vehicle 2 travels according to the target locus and travels along the target locus by a preset ratio. Specifically, when the vehicle 2 travels along the target locus by a predetermined locus update ratio from the location point where the target locus has been created, the controller creates the new target locus again. However, to more reduce the uncomfortable feeling of the driver in the locus control when traveling along the curve, it is preferable to set a value of the locus update ratio (for example, the locus update of FIG. 9: refer to at the time of use of 50%) to an appropriate value. This is because the created target locus is dispersed depending on the value of the locus update ratio as illustrated in FIG. 15. FIG. 15 is a view for explaining the dispersion of loci created when an initial value of an update position is changed.

As illustrated in, for example, FIG. 15, when a value of the locus update is set to 25%, dispersion of about 2 cm occurs to a created target locus. When the value of the locus update is set to 50%, dispersion of about 10 cm occurs to the created target locus. When the value of the locus update is set to 75%, dispersion of about 20 cm occurs to the created target locus. Further, when the value of the locus update is set to 99%, dispersion of about 35 cm occurs to the created target locus. As described above, when the target locus is used longer (when, for example, the value of the locus update is set to 99% and 75%), dispersion is more likely to occur to the created target locus because an initial update position becomes more different.

To cope with the problem, the embodiment sets a locus update ratio for creating the target locus again (namely, the value of the locus update) according to a road shape. The road shape is decided by a change ratio of a radius of curvature of a curve. When, for example, the change ratio of the radius of curvature of the curve is large, since it is thought that the road shape changes large, it is preferable to set the value of the locus update small. This is because it can be reduced that the target locus is updated later to a travel road and that uncomfortable feeling that a target locus intended by a driver is offset. In contrast, when the change ratio of the radius of curvature of the curve is small, since it is thought that the road shape changes small, it is preferable to set the value of the locus update large. With the configuration, when the automatic driving is carried out on the travel road where the road shape does not much change, since control can be carried out so as not to create an unnecessary target locus, the locus control can be efficiently carried out without increasing a calculation load.

Figure 16:
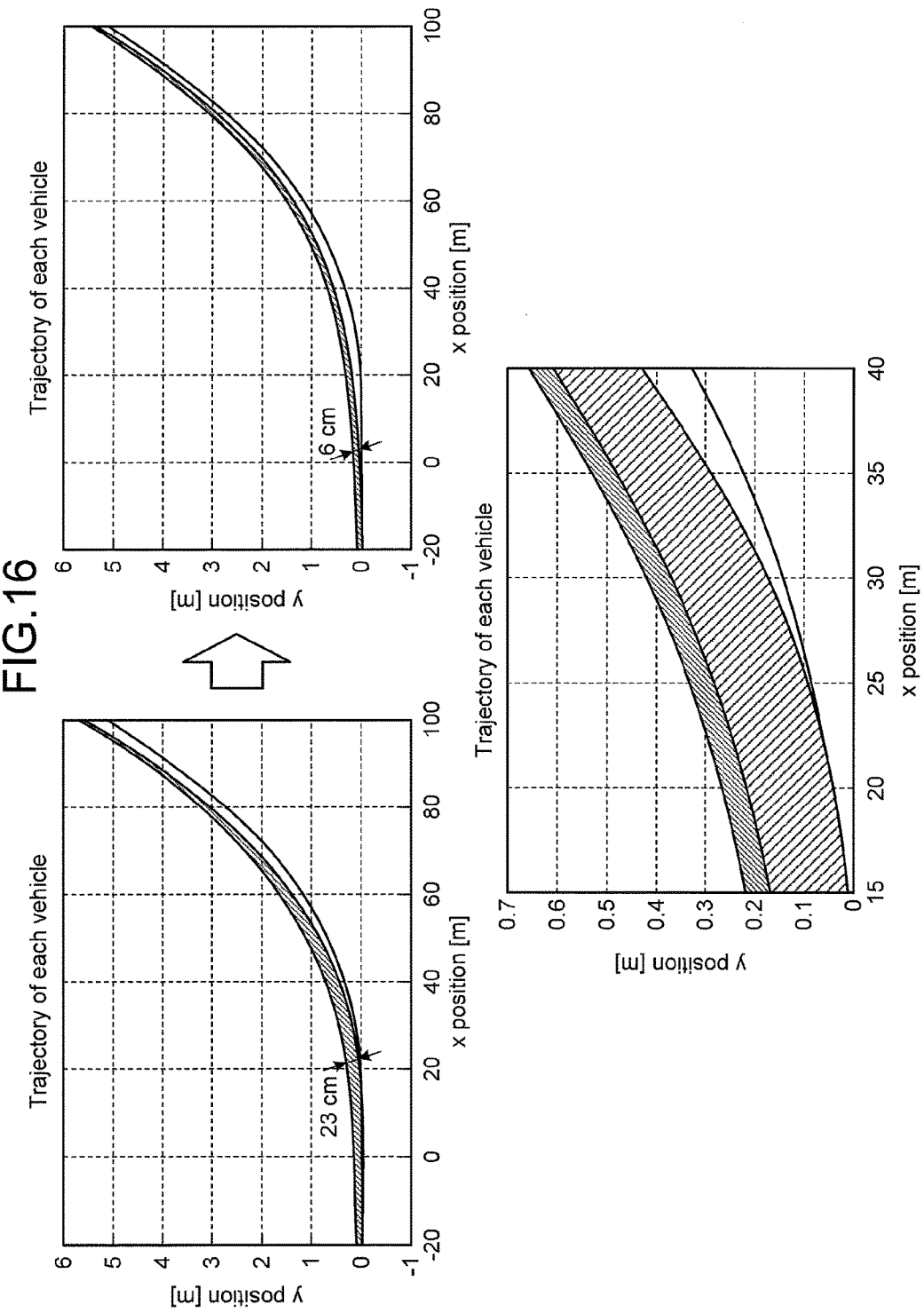
FIG. 16 is a view illustrating an example of dispersion of loci.

According to the embodiment, since the locus update ratio for creating the target locus again is set according to the road shape, dispersion of the created target locus can be suppressed as illustrated in, for example, FIG. 16. FIG. 16 is a view illustrating an example dispersion of a locus. An upper left portion of FIG. 16 illustrates a case that the invention is not used, locus update timing (the locus update ratio) is set to 75% unexceptionally. An upper right portion of FIG. 16 illustrates a case that the locus update timing in a portion in which a curve curvature changes is set to 25%. A lower portion of FIG. 16 illustrates both the cases by overlapping them for comparison. Namely, FIG. 16 illustrates a result that the dispersion of the locus offset up to a maximum of 23 cm is suppressed to a maximum of 6 cm. When the locus is dispersed, although there is possibility that an effect of the embodiment illustrated in FIG. 14 cannot be obtained, the effect of FIG. 14 can be guaranteed by suppressing the dispersion of the locus as illustrated in FIG. 16.

Figure 17:
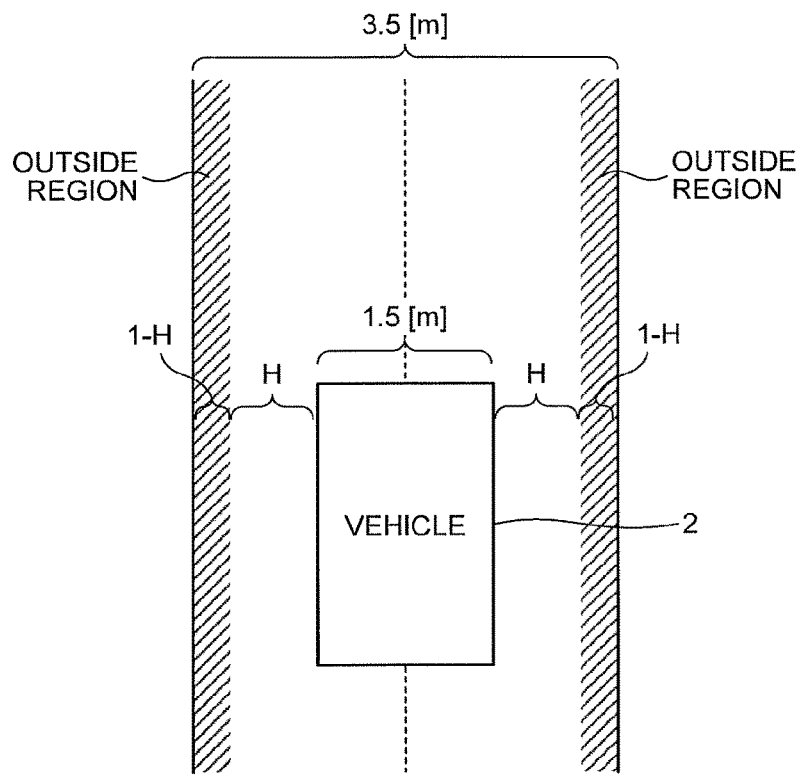
FIG. 17 is a view illustrating an example of an outside region.
Figure 18:
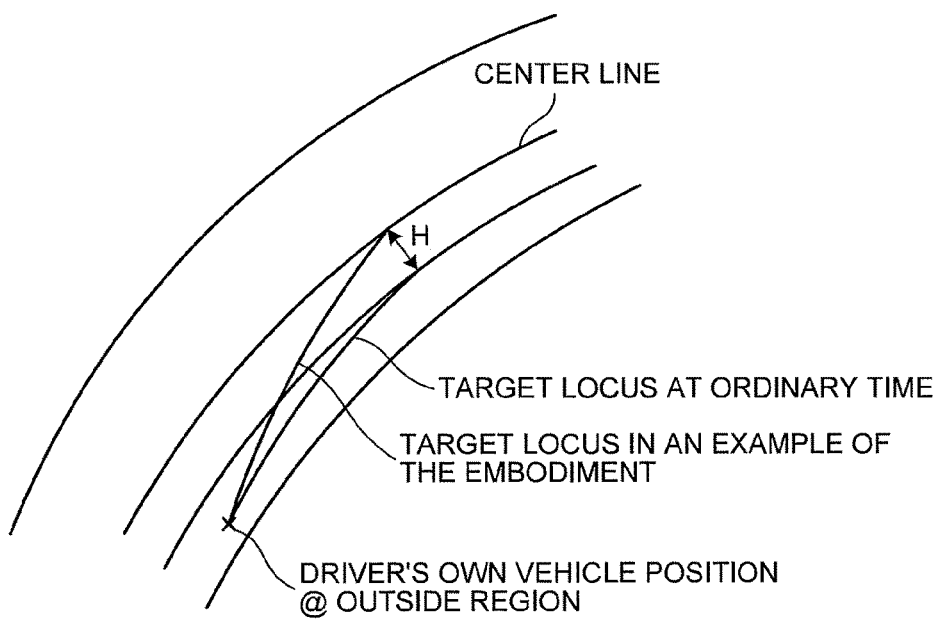
FIG. 18 is a view illustrating an example of a changed target locus.

The driving support apparatus 1 of the embodiment has also a function for creating the target locus by changing the target point when a status error (a lateral offset) of the driver's own vehicle is equal to or larger than a threshold value (namely, when the status error exceeds the lateral displacement H). Specifically, when a driver's own vehicle position of the vehicle 2 is located in an outside region of a travel possible region, the controller changes the target point to a road center side. For example, as illustrated in FIG. 17, an outside of the lateral displacement H obtained in FIG. 7 is defined as an outside region. FIG. 17 is a view illustrating an example of the outside region. In an ordinary control state, although the target locus of the driver's own vehicle is not located in the outside region, there is thought a case that the target locus extends to the outside region by a disturbance such as lateral wind. At the time, since a risk that the vehicle 2 runs off a traffic lane increases, the target locus is changed nearer to a center than an ordinary target point. For example, FIG. 18 is a view illustrating an example of the target locus having been changed. As illustrated in FIG. 18, when the driver's own vehicle position is located in the outside region, the controller changes the target locus to a target locus nearer to a center line side than the target locus that is ordinarily set inside of the curve (a target locus at an ordinary time in FIG. 18) so that the lateral displacement H=0 is satisfied on the center line side (the target locus of the embodiment in FIG. 18).

Further, the driving support apparatus 1 of the embodiment has also a function for changing the target locus by recognizing other vehicle and an obstacle in a peripheral region. Specifically, when a peripheral object exists on an adjacent traffic lane within the pre-read distance L from the driver's own vehicle position of the vehicle 2, the controller changes the target point in a direction away from the peripheral object in the travel possible region. When, for example, the controller recognizes the peripheral object such as the obstacle and the peripheral vehicle in the adjacent traffic lane within the pre-read distance L from the driver's own vehicle position of the vehicle 2, the controller sets the target locus that is offset by the lateral displacement H so that the vehicle 2 is away from the peripheral object. A value of the lateral displacement H is decided from a road width a driver's own vehicle width, a position of the driver's own vehicle, and a lateral position of the peripheral object.

Figure 19:
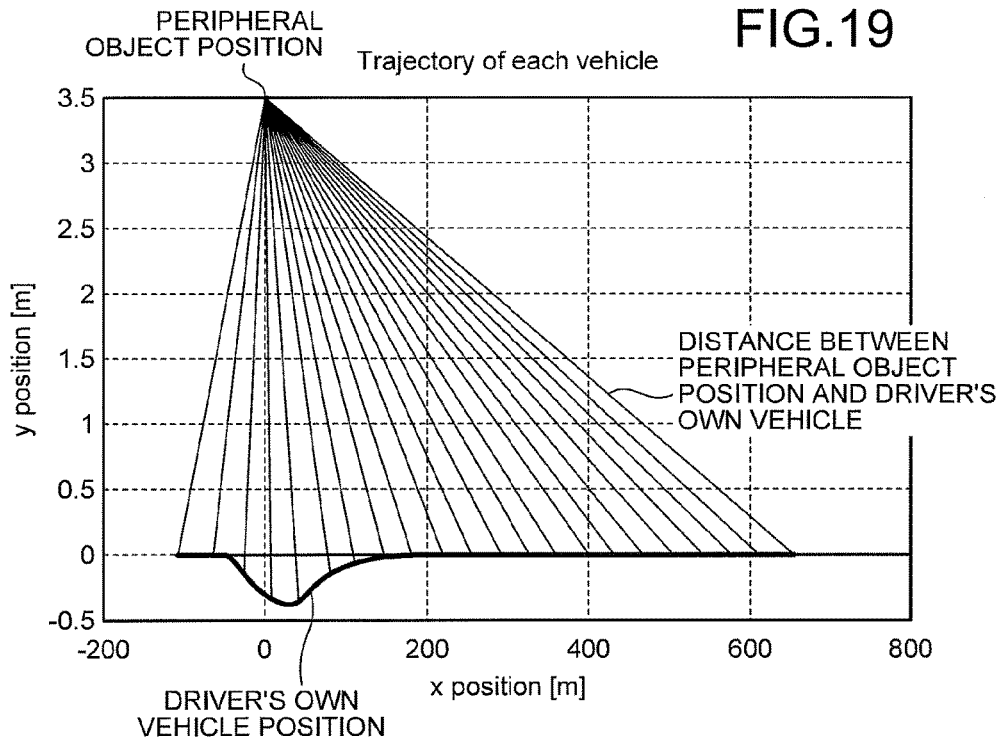
FIG. 19 is a view illustrating an example of a target locus when a peripheral object is at rest.
Figure 20:
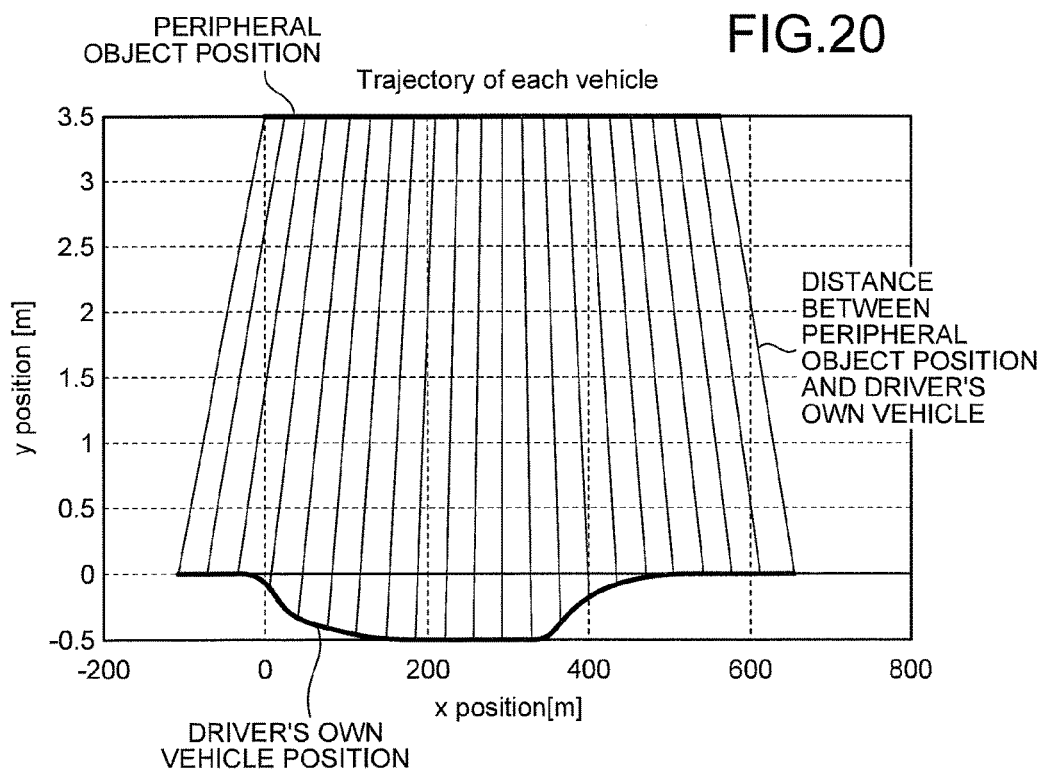
FIG. 20 is a view illustrating an example of a target locus when the peripheral object moves.

FIG. 19 and FIG. 20 illustrate an example that the controller creates a target locus of the driver's own vehicle when, for example, a distance to the peripheral object is set to H=0.5 m. FIG. 19 is a view illustrating an example of a target locus when the peripheral object is at rest. FIG. 20 is a view illustrating an example of the target locus when the peripheral object moves. In both FIG. 19 and FIG. 20, the driver's own vehicle travels at 80 km/h, FIG. 19 illustrates that the obstacle is at rest, and FIG. 20 illustrates that the peripheral vehicle such as a large truck travels at 60 km/h. In FIG. 19 and FIG. 20, straight lines showing distances between the peripheral object and the driver's own vehicle are drawn connecting the position of the peripheral object and the positions of the driver's own vehicle at the same time and illustrate positional relations between both of them. It can be found by observing the straight lines that the driver's own vehicle begins to increase a space with an allowance before it travels in parallel with the peripheral object such as the obstacle and the peripheral vehicle and returns to an original position when it has overtaken the peripheral object.

Figure 21:
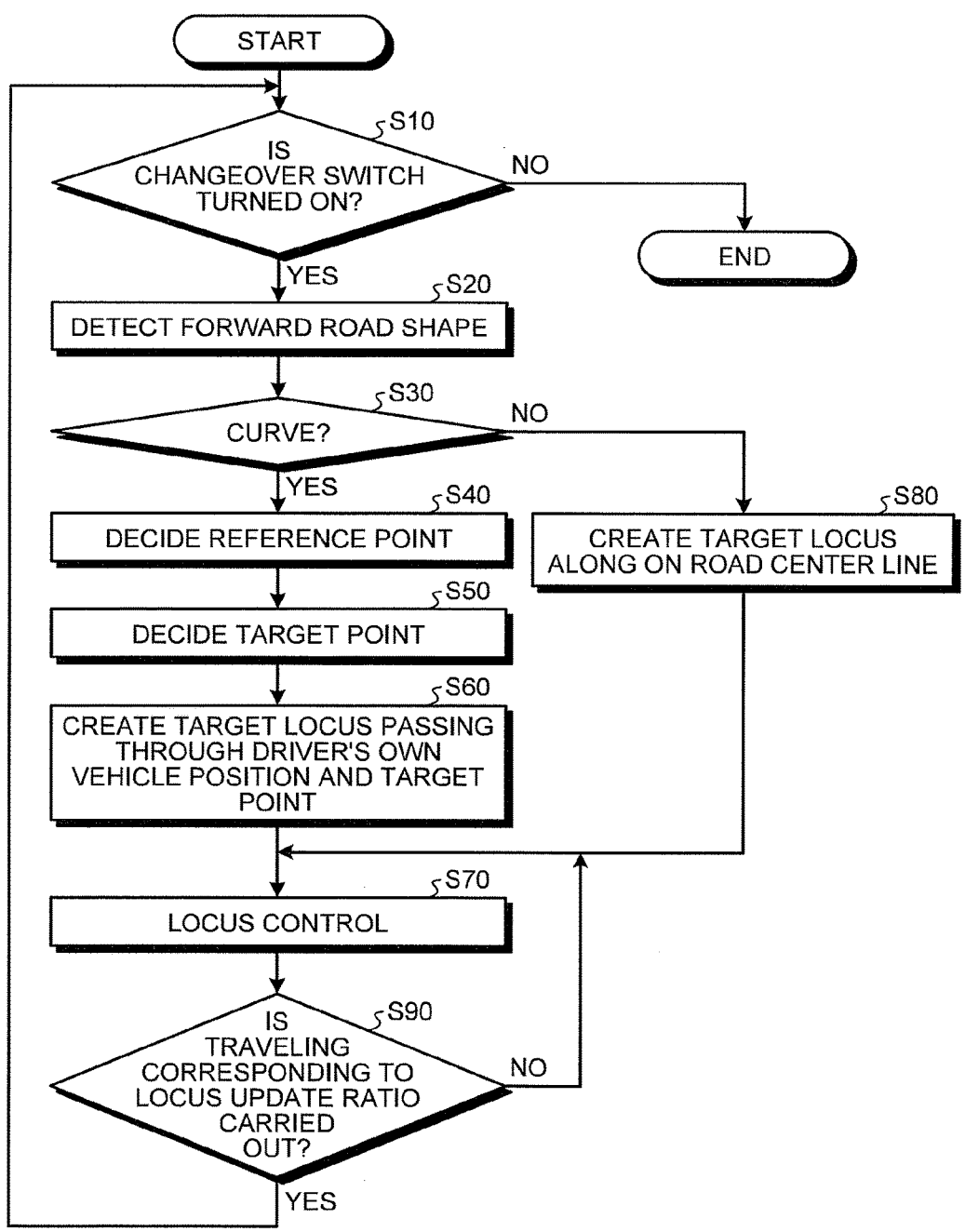
FIG. 21 is a flowchart illustrating an example of a process carried out by the driving support apparatus according to the embodiment.

Subsequently, an example of a process carried out in the driving support apparatus 1 configured as described above will be explained referring to FIG. 21. FIG. 21 is a flowchart illustrating the example of the process carried out by the driving support apparatus 1 according to the embodiment. The process illustrated in FIG. 21 is specifically carried out in the controller of the driving support apparatus 1.

As illustrated in FIG. 21, the controller determines whether or not a changeover switch for controlling on/off of the automatic driving is set to an on state (step S10). At step S10, when it is determined that the changeover switch is set to the on state, the process goes to processing at step S20. In contrast, when it is determined at step S10 that the changeover switch is in an off state, the processing is finished thereafter.

The controller detects a road shape forward of the vehicle 2 (step S20). Specifically, at step S20, the controller detects a road curvature forward of the vehicle 2 based on information of a white line on a road detected by the travel possible region detecting device. More Specifically, the controller recognizes a shape of the white line based on image processing by a camera that configures the travel possible region detecting device and on a result of a forward survey by a milliwave radar and an ultrasonic wave sensor and detects the road curvature forward of the vehicle 2 corresponding to the shape of the white line. Further, the controller may detect the road curvature forward of the vehicle 2 based on a present position of the vehicle 2 input from the GPS information receiver 14 and on the map information. More specifically, the controller may obtain the road shape existing forward of the present position of the vehicle 2 from map data and detect the road curvature forward of the vehicle 2 based on the road information included in the map data.

The controller determines whether or not the white line is a curve or not based on a result of a forward curvature detection at step S20 (step S30). Specifically, when a curvature exists at step S30, the controller determines that the white line is the curve based on the result of detection of the road curvature forward of the vehicle 2 corresponding to the shape of the white line and determines that the while line is a straight line when no curvature exist. Further, at step S30, when the curvature exists, the controller may determine that the white line is the curve based on the result of detection of the road curvature forward of the vehicle 2 based on the road information included in the map data, and when no curvature exists, the controller may determine that the while line is the straight line.

When the controller determines at step S30 that the white line is the curve (step S30: Yes), as illustrated in FIG. 5 described above, the controller decides the road center of the curve, which is located forward of the driver's own vehicle position of the vehicle 2 in a traveling direction by the pre-read distance L set according to the vehicle speed of the vehicle 2, as a reference point (step S40). The controller decides a position, which is offset inside of the curve from the reference point by the lateral displacement H set according to the radius of curvature of the curve at the reference point decided at step S40, as a target point (step S50). The controller creates a target locus so that it passes through the driver's own vehicle position and the target point decided at step S50 (step S60). Thereafter, the controller controls the travel controller and carries out the locus control based on the driver's own vehicle position created at step S60 and on the target locus passing through the target point (step S70).

In contrast, when the controller determines at step S30 that the white line is not the curve (step S30: No), the controller creates the target locus along on a road center line corresponding to a center line of the travel possible region detected by the travel possible region detecting device (step S80). Thereafter, the controller controls the travel controller and carries out the locus control based on the target locus on the road center line created at step S80 (step S70).

After the start of execution of the locus control at step S70, the controller determines whether or not the vehicle 2 has travelled by the locus update ratio (step S90). When it is determined at step S90 that the vehicle 2 has travelled by the locus update ratio (step S90: Yes), the process returns to step S10, and when the changeover switch remains in the on state, the process goes to step S20 and subsequent steps and a new target locus is created again. Note that when it is determined at step S90 that the vehicle 2 has not travelled by the locus update ratio (step S90: No), the locus control at step S70 is continued until the vehicle 2 travels by the locus update ratio.

Note that, in the processing at step S50 of FIG. 21, when the driver's own vehicle position of the vehicle 2 is located in the outside region of the travel possible region, the controller may change the target point to the road center side. Further, in the processing at step S50 of FIG. 21, when the peripheral object exists on the adjacent traffic lane within the pre-read distance L from the driver's own vehicle position of the vehicle 2, the controller may change the target point in a direction away from the peripheral object in the travel possible region. Likewise, when the driver's own vehicle position of the vehicle 2 is located in the outside region of the travel possible region at the time the vehicle 2 travels on the straight road, the controller may change the target locus to the road center side, and when the peripheral object exists on the adjacent traffic lane, the controller may change the target locus in a direction away from the peripheral object in the travel possible region.

In the embodiment, although the driving support apparatus 1 has been explained mainly as to the example in which the driving support apparatus 1 is mounted on the 4 wheel steering vehicle 2 as illustrated in FIG. 1 described above, the embodiment is not limited thereto. The driving support apparatus 1 according to the embodiment may be mounted on a front-wheel steering vehicle 2. In the case, the driving support apparatus 1 according to the embodiment may carry out the vehicle control in the vehicle 2 having the steering device 6 as a 2 wheel steering mechanism composed of the front wheel steering device 9. Further, even when the driving support apparatus 1 is mounted on the 4 wheel steering vehicle 2, the driving support apparatus 1 may carry out the vehicle control using the 4 wheel steering vehicle 2 as the 2 wheel steering vehicle 2 when a 4 wheel steering mode can be switched to a 2 wheel steering mode and vice versa via a switch capable of switching the 4 wheel steering mode and the 2 wheel steering mode by operation of the driver.

In the 2 wheel steering, the steering device 6 can steer the front wheels 3F of the vehicle 2 and is configured here including the front wheel steering device 9. Namely, in the driving support apparatus 1 of the 2 wheel steering, the steering device 6 is composed of the front wheel steering device 9 and the front left wheel 3FL and the front right wheel 3FR becomes the wheels to be steered. In the 2 wheel steering, the ECU 7 controls the front wheel steering device 9 by the control amount of the front wheel steering angle $\delta_f$ calculated based on index as to the created target locus in addition to, for example, the handle steering angle MA and the vehicle speed V as a target vehicle behavior amount. As a result, the vehicle 2 can travel along the target locus while the front wheels 3F are steered by the locus control via the front wheel steering device 9.

REFERENCE SIGNS LIST 1 driving support apparatus
2 vehicle
3 wheel
4 drive device (travel controller)
5 brake device (travel controller)
6 steering device (travel controller)
7 ECU (controller)
8a accelerator pedal
8b brake pedal
9 front wheel steering device
9a steering wheel
9b steering angle application mechanism
9c VGRS device
9d steering driver
10 rear wheel steering device
10a steering driver
11 wheel speed sensor
12 wheel cylinder pressure sensor
13 forward detector (travel possible region detecting device)
14 GPS information receiver

The invention claimed is:

1. A driving support apparatus comprising:
at least one detector configured to detect a travel possible region of a vehicle; and
a processor configured to:
determine a road center of a curve, which is located forward of a traveling direction by a predetermined distance which is set according to a vehicle speed of the vehicle from a driver's own vehicle position of the vehicle, as a reference point, at the time the curve exists forward of the traveling direction of the vehicle,
determine a position offset from the reference point to an inside of the curve by a lateral displacement which is set according to a radius of curvature of the curve at the reference point, as a target point,
create the target locus so as to pass through the driver's own vehicle position and the target point,
control the vehicle to pass through the target locus, and
create a new target locus according to a predetermined locus update ratio,
wherein the predetermined locus update ratio is the degree the vehicle has traveled along the target locus form a location where the target locus has been created.

2. The driving support apparatus according to claim 1, wherein a faster vehicle speed sets the predetermined distance to be a greater distance from the vehicle.

3. The driving support apparatus according to claim 1, wherein a larger radius of curvature of the curve sets the lateral displacement to be smaller than a smaller radius of curvature of the curve.

4. The driving support apparatus according to claim 1, wherein the locus update ratio for creating the new target locus is set according to a road shape.

5. The driving support apparatus according to claim 4, wherein the road shape is decided by a change ratio of the radius of curvature of the curve.

6. The driving support apparatus according to claim 1, wherein at the time the driver's own vehicle position of the vehicle is located in an outside region of the travel possible region, the processor is configured to change the target point to the road center side.

7. The driving support apparatus according to claim 1, wherein at the time a peripheral object exists on an adjacent traffic lane in the predetermined distance from the driver's own vehicle position of the vehicle, the processor is configured to change the target point in a direction away from the peripheral object in the travel possible region.

8. A driving support method carried out in a driving support apparatus including at least one detector configured to detect a travel possible region of a vehicle and a processor configured to determine a target locus and control the vehicle according to the target locus,
the driving support method comprising:
determining a road center of a curve, which is located forward of a traveling direction from a driver's own vehicle position of the vehicle by a predetermined distance which is set according to a vehicle speed of the vehicle, as a reference point, at the time the curve exists forward of the traveling direction of the vehicle;
determining a position offset from the reference point to inside of the curve by a lateral displacement which is set according to a radius of curvature of the curve at the reference point;
creating the target locus using the position offset;
controlling the vehicle to pass through the target locus, and
creating a new target locus according to a predetermined locus update ratio, wherein the predetermined locus update ratio is the degree the vehicle has traveled along the target locus from a location where the target locus has been created.

* * * * *